United States Patent [19]

Ichikawa

[11] Patent Number: 5,712,993
[45] Date of Patent: Jan. 27, 1998

[54] SYSTEM FOR CREATING GRAPHICAL USER INTERFACES USING CHANGEABLE MODELS FOR CONSTITUENT PARTS

[75] Inventor: Takehiko Ichikawa, Yamatokooriyama, Japan

[73] Assignee: Sharp Kabushiki Kaisha, Osaka, Japan

[21] Appl. No.: 442,973

[22] Filed: May 17, 1995

[30] Foreign Application Priority Data

Jul. 19, 1994 [JP] Japan ................................. 6-166839

[51] Int. Cl.⁶ ............................................. G06F 3/00
[52] U.S. Cl. ............................................. 395/326
[58] Field of Search ............................. 395/155–161, 395/326–358

[56] References Cited

U.S. PATENT DOCUMENTS 5,335,320   8/1994   Iwata et al. ......................... 395/155
5,347,629   9/1994   Barrett et al. ...................... 395/161
5,555,370   9/1996   Li et al. ............................. 395/161

*Primary Examiner*—Mark R. Powell
*Assistant Examiner*—A. Katbab

[57] ABSTRACT

In a graphical user interface (GUI) creation system, a GUI creator creates a form of a GUI interactively on a display screen. A control manager reads a control definition file from a control definition file storage, interprets the same and manages a control resulting from the interpretation. A control definition file creator creates a control definition file and records the same in the control definition file storage. A form manager manages forms recorded in a form storage and constituent parts recorded in a part storage. Through this arrangement the contents of the control definition file storage are rendered variable so that device information and definitions of a control may be readily changed. Constituent parts created are recorded in the part storage, and this enables the reuse of the constituent parts.

20 Claims, 7 Drawing Sheets

Fig. 2

ELECTRONIC NOTEBOOK CONTROL DEFINITION FILE

INFORMATION ON APPLICABLE INFORMATION PROCESSING DEVICE  ⎫
SCREEN SIZE : 450×200                                       ⎬ (A)
PRODUCT TYPE NAME : "ELECTRONIC NOTEBOOK"                   ⎭
VERSION : 0.1
CONTROL DEFINITION

INCLUDE OTHER CONTROL DEFINITION FILES  ⎫
include "BUTTONCLASS.ctl"                  ⎬ (B)
                                           ⎭

Fig. 3

```
#BUTTONCLASS CONTROL DEFINITION FILE
BUTTONCLASS {
    super: BasicClass
    imagetype: {if @ProductType=="ELECTRONIC NOTEBOOK" then      ⎫
                    MONOCHROMEIMAGE                              ⎪
                else                                              ⎬ (C)
                    COLORIMAGE                                   ⎪
                endif                                            ⎪
               }                                                 ⎭
;
#ATTRIBUTE NAME {TYPE NAME, RESTRICTION, INITIAL VALUE}
    Name    {string,@Self,"unnamedpart" }                           — (D)
    PosX    {if @ProductType=="ELECTRONIC NOTEBOOK" then         ⎫
                    short                                         ⎬ (E)
                else                                             ⎪
                    int                                          ⎭
             endif,@FORMWIDTH/2, }
    PosY    {if @ProductType=="ELECTRONIC NOTEBOOK" then         ⎫
                    short                                         ⎬ (F)
                else                                             ⎪
                    int                                          ⎭
             endif, @FORMHEIGHT/2,}
    Width   {short,0<@Width<@FORMWIDTH/5,}                          — (G)
    Height  {short,0<@Heigth<@FORMHEIGHT/8,}                        — (H)
    BtnType {enum,{NoSelectReverse | NoSelectNormal},            ⎫
             if @Version <=0.1 then                              ⎪
                    NoSelectNormal                                ⎬ (I)
             else                                                ⎪
                    NoSelectReverse                              ⎪
             endif }                                             ⎭
;
#EVENT FUNCTION {FUNCTION TYPE, {ARGUMENT DECLARATION}, LINKED EVENT}
    ButtonPress {if @ProductType=="ELECTRONIC NOTEBOOK" then     ⎫
                     short                                       ⎪
                 else                                             ⎬ (J)
                     int                                         ⎪
                 endif,                                          ⎪
                 { @FormID,@ItemID }, @EVENTPENDOWN }            ⎭
    ButtonSelect {if @ProductType=="ELECTRONIC NOTEBOOK" then    ⎫
                     short                                       ⎪
                  else                                           ⎪
                     int                                          ⎬ (K)
                  endif,                                         ⎪
                  {@FormID,@ItemID },                            ⎪
                  @EVENTPENDOWN | @EVENTSTILLDOWN}               ⎭
}
```

5,712,993

SYSTEM FOR CREATING GRAPHICAL USER INTERFACES USING CHANGEABLE MODELS FOR CONSTITUENT PARTS

BACKGROUND OF THE INVENTION

1. Field of the Invention

The present invention relates to a graphical user interface (hereinafter referred to as GUI) creation system for use in information processing devices.

2. Description of the Prior Art

Hitherto, GUI creation systems have been known which are of the type described below (Japanese Patent Application Laid-Open Nos. 4-157528 and 5-2477).

In order to create a GUI for a specified information processing device, models of constituent parts of the GUI (hereinafter each model will be referred to as "control"), as well as information on the information processing device to which the GUI is applicable, are previously incorporated in the GUI creation system. Therefore, it is impracticable to change definitions of the controls and/or create a GUI for a different information processing device. With such prior art GUI creation systems, therefore, in order to make it possible to newly define a control (i.e., change the function of the control) or create a GUI for a different information processing device, it is necessary that the GUI creation system itself be modified.

In the conventional GUI creation system, the controls may be reutilized for a plurality of GUI screens (hereinafter each GUI screen will be referred to as 'form') as models of constituent parts of the 'forms'. Constituent parts created through reutilization of the control are managed for individual 'forms'. That is, the constituent parts created are inherent in the individual 'forms', and they cannot be shared by or reutilized in a plurality of 'forms'. As such, it is necessary that several constituent parts having the same functions be created for each individual 'form'.

SUMMARY OF THE INVENTION

Accordingly, it is an object of the present invention to provide a GUI creation system which makes it possible to readily change information on applicable information processing devices and the definitions of the controls. It is another object of the invention to provide a highly efficient GUI creation system which permits sharing and reuse of constituent parts created.

In order to achieve the aforementioned object, the present invention provides a graphical user interface creation system for creating graphical user interfaces (GUIs) for use in various information processing devices, comprising:

a definition file storage means for storing definition files which each describe definition of a model for a respective constituent part of a GUI and also describe device information on an information processing device to which the GUI is applicable;

a definition file creation means for creating the definition files to be stored in said definition file storage means, said definition file creation means being capable of changing data stored in said definition file storage means;

an interpretation means for reading out a desired definition file from said definition file storage means and interpreting the definition file; and a GUI creation means for creating a GUI based on interpretation results by said interpretation means.

In this GUI creation system, definition files created by the definition file creation means are recorded in the definition file storage means. The definition file interpretation means reads out a desired definition file from the definition file storage means and interprets the definition of a model for a constituent part and device information described in the definition file. The definition of the model defines a function of the corresponding constituent part. Then, on the basis of this interpretation, the GUI creation means creates a constituent part of the GUI for an object information processing device. When required, the definition file creation means changes data stored in the definition file storage means. Accordingly, the GUI creation system of the present invention can create a GUI using constituent parts having functions as desired by an operator. For the same reason, the GUI creation system of the present invention can create a GUI for an information processing device of any type as desired by an operator.

In an embodiment, the definitions in the definition files are each described using a conditional branch and the interpretation means includes means for interpreting contents of the conditional branch.

In this embodiment, constituent parts having different functions can be created using a single definition file. This provides for some reduction in the labor required of an operator in creating models for the constituent parts, as well as in creating GUIs. Thus, this GUI creation system is a highly efficient system.

In another embodiment, the GUI creation system further comprises a part storage means for storing the constituent parts created by the GUI creation means separately from each other such that any constituent part stored in said part storage means is reusable in creation of another GUI by said GUI creation means.

The present invention also provides a graphical user interface creation system for creating graphical user interfaces (GUI) for use in various information processing devices, comprising:

a GUI creation means for creating a GUI, said GUI creation means including a part creation means for creating constituent parts of the GUI;

a part storage means for storing the constituent parts created by said part creation means separately from each other; and a part management means for recording the constituent parts created by the part creation means into the part storage means and also for holding therein the constituent parts read from the part storage means;

wherein, when utilizing any constituent part recorded in said part storage means, said GUI creation means fetches a corresponding constituent part held in the part management means.

In the above GUI creation systems, when a GUI is to be created through the utilization of constituent parts stored in the part storage means, the part management means reads constituent parts from the part storage means and holds the constituent parts therein. The constituent parts held in the part management means are fetched by the GUI creation means as constituent parts of the object GUI.

Thus, a GUI can be created through the sharing and/or reuse of constituent parts which are already stored in the part storage means.

In the prior art system, it is necessary to create identical constituent parts in plurality to create different GUIs when same constituent parts are included in the different GUIs. In contrast, according to the present invention, a constituent part stored in the part storage means may be shared by different GUI 'forms'. Therefore, it is not necessary to create identical constituent parts in plurality. Further, any constituent part stored in the part storage means may be reused to create a new constituent part.

According to the invention, therefore, it is possible to provide a highly efficient GUI creation system which permits the sharing and/or reutilization of constituent parts created.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a chart showing, by way of example, descriptions in a control definition file registered in a control definition file storage shown in FIG. 1;

FIG. 3 is a chart showing, by way of example, descriptions in another control definition file;

DETAILED DESCRIPTION OF THE PREFERRED EMBODIMENTS

The present invention is described in further detail by way of illustrated embodiments.

Figure 1:
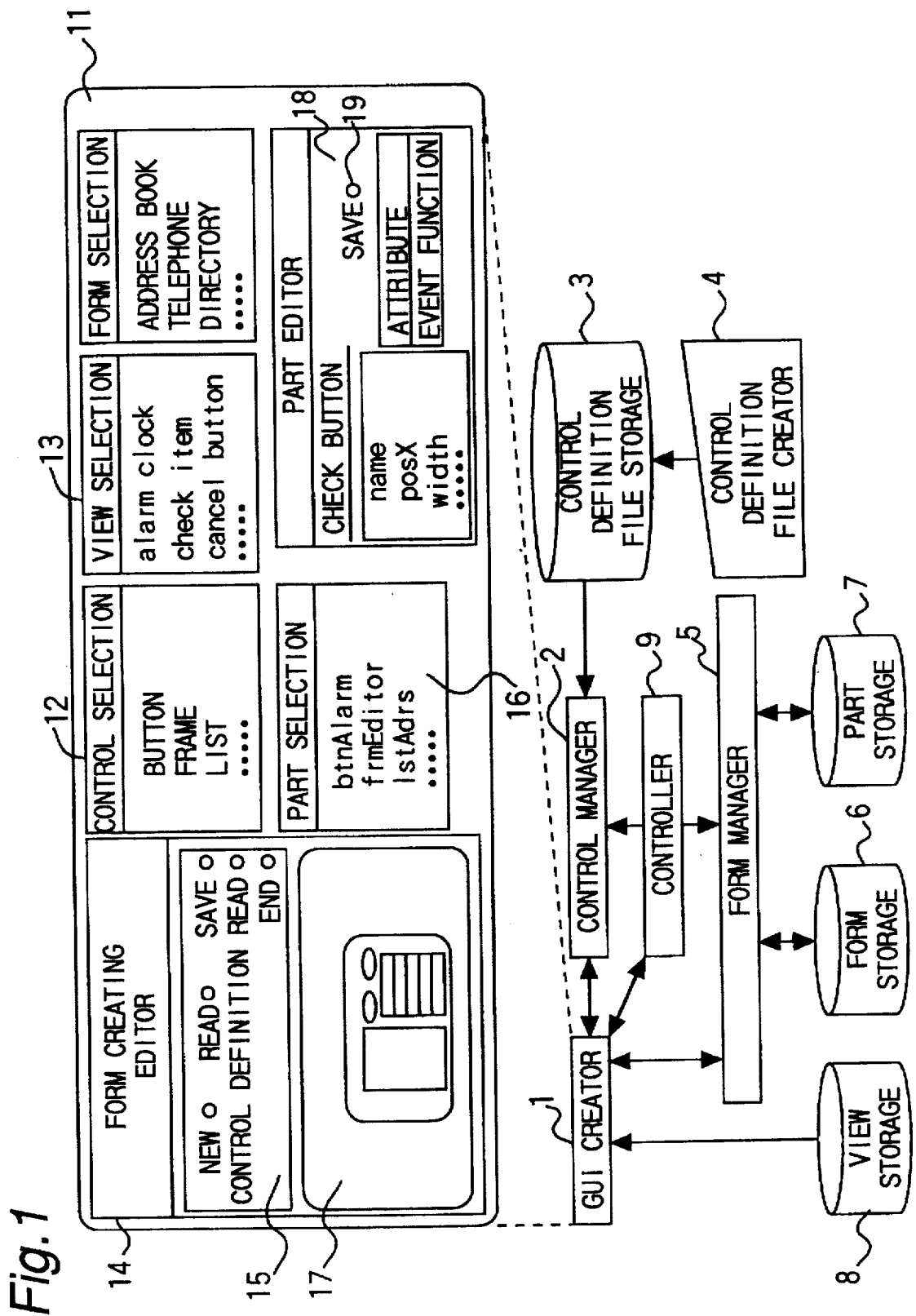
FIG. 1 is a block diagram showing one embodiment of the GUI creation system in accordance with the present invention.

FIG. 1 is a block diagram showing one embodiment of the GUI creation system in accordance with the invention. Referring to FIG. 1, a GUI creator 1, through presentation of a display screen 11 for GUI creation, creates a GUI in interactive relation with an operator of the GUI creation system. A control manager 2 reads from a control definition file storage 3 a control definition file in which the definition of a control (hereinafter referred to as "control definition") is described, and interprets the control definition. A control obtained through the interpretation of the control definition is held and managed by the control manager 2. Individual control definition files to be recorded in the control definition file storage 3 are created by a control definition file creator 4 and then so recorded. The control definition file creator 4 includes an editor such as a general-purpose text editor, a dedicated control definition editor, or the like.

A form manager 5 manages a 'form' which constitutes a GUI, and individual constituent parts which constitute the 'form'. Each 'form' created by the GUI creator 1 and each constituent part of the 'form' are respectively recorded in a form storage 6 and a part storage 7. Any existing form and constituent part may be read respectively from the form storage 6 and part storage 7 and held in an internal memory.

A view storage 8 stores therein data on an image, i.e., a visual representation of each control. A control is selected on the basis of a list presented in a control selection area 12 of the display screen 11 displayed by the GUI creator 1. Image data stored in the view storage 8 is selected on the basis of a list presented in a view selection area 13. The control, which represents the function of a constituent part to be created, and the image, which is a visual representation of the control, are combined together to create a new constituent part.

Numeral 9 designates a controller which controls the GUI creator 1, the control manager 2, and the form manager 5 to execute a GUI creating operation, which will be described in detail later.

FIGS. 2 and 3 show examples of data descriptions in control definition files recorded in the control definition file storage 3.

In these figures, the character string beginning with "#" presents a comment. A control definition file contains descriptions with respect to device information on an information processing device to which is applied the GUI to be created using the controls, and a plurality of control definitions.

For example, in FIG. 2, as device information on the subject information processing device there are given descriptions as to:

(Screen Size, Product Type Name, Version)

as generally indicated by (A). Also, as indicated by (B), this control definition file includes a description of another file in which control definition has been made (in the present example, "BUTTONCLASS.ctl" as shown in FIG. 3).

With an include function given in this way, the control definition itself can be readily modularized (sorted). Therefore, it is possible, for example, to allow some of controls created for a particular information device to be shared between a plurality information processing devices.

In the example given in FIG. 3, there is shown a description of a control definition file entitled BUTTONCLASS.

In the figure, the character string beginning with symbol "@" instructs reference to certain information held in the control manager 2 and/or in the form manager 5 (such information will be referred to as "information within the GUI creation system"). For example, in the description represented by (C), it is shown that a constituent part of this particular class has a monochrome image if the type of device (@ProductType) is an "Electronic Notebook" (i.e., if an "Electronic Notebook Control" is held in the control manager 2); or else the constituent part has a color image.

In the descriptions written in (D) through (I), there is given a declaration of attributes. In this example, the format is as follows:

Attribute Name {Type Name, Restriction, Initial Value}, and declarations with respect to "type name", "restriction", and "initial value" are written in programs including conditional branches.

For example, in the description of the attribute (PosX) declaration (E), if the product type name (@ProductType) is "Electronic Notebook", the type is "short"; or otherwise the type is "int". The description of the restriction portion means that the value of the attribute must be "one half of the width of the 'form' (@FORMWIDTH)".

In the descriptions given in (J) and (K), there is declared the action of the constituent part's own (event function) in response to operation events by input devices, such as a keyboard, a mouse, and a pen. In this example, the format requires:

Event Function Name {Function Type, {Argument Declaration}, Linked Event}.

The type name declaration, the argument declaration, and the linked event declaration are described in programs including a conditional branch, etc.

For example, in the description (J) of the event function , "ButtonPress" declaration, only where the product type name (@ProductType) is "Electronic Notebook", the function type is "short"; otherwise the function type is "int". The argument assumes a form identifier (@FormID) for the 'form' in which a constituent part of the control BUTTONCLASS is disposed, and an item identifier (@ItemID) for a constituent part or parts in the 'form'. There is made a declaration that the event function is called when there occurs an event that "a pen point is put down within the area of the control item" (@ EVENTPENDOWN).

The description (K) on the declaration of the next event function , "ButtonSelect" indicates that when the event (@EVENTPENDOWN) or an event (@ EVENTSTILLDOWN) occurs, the function is activated. In this case, too, by describing programs, such as conditional branches, it is possible to describe various restrictions with respect to which event functions are called.

Figure 4:
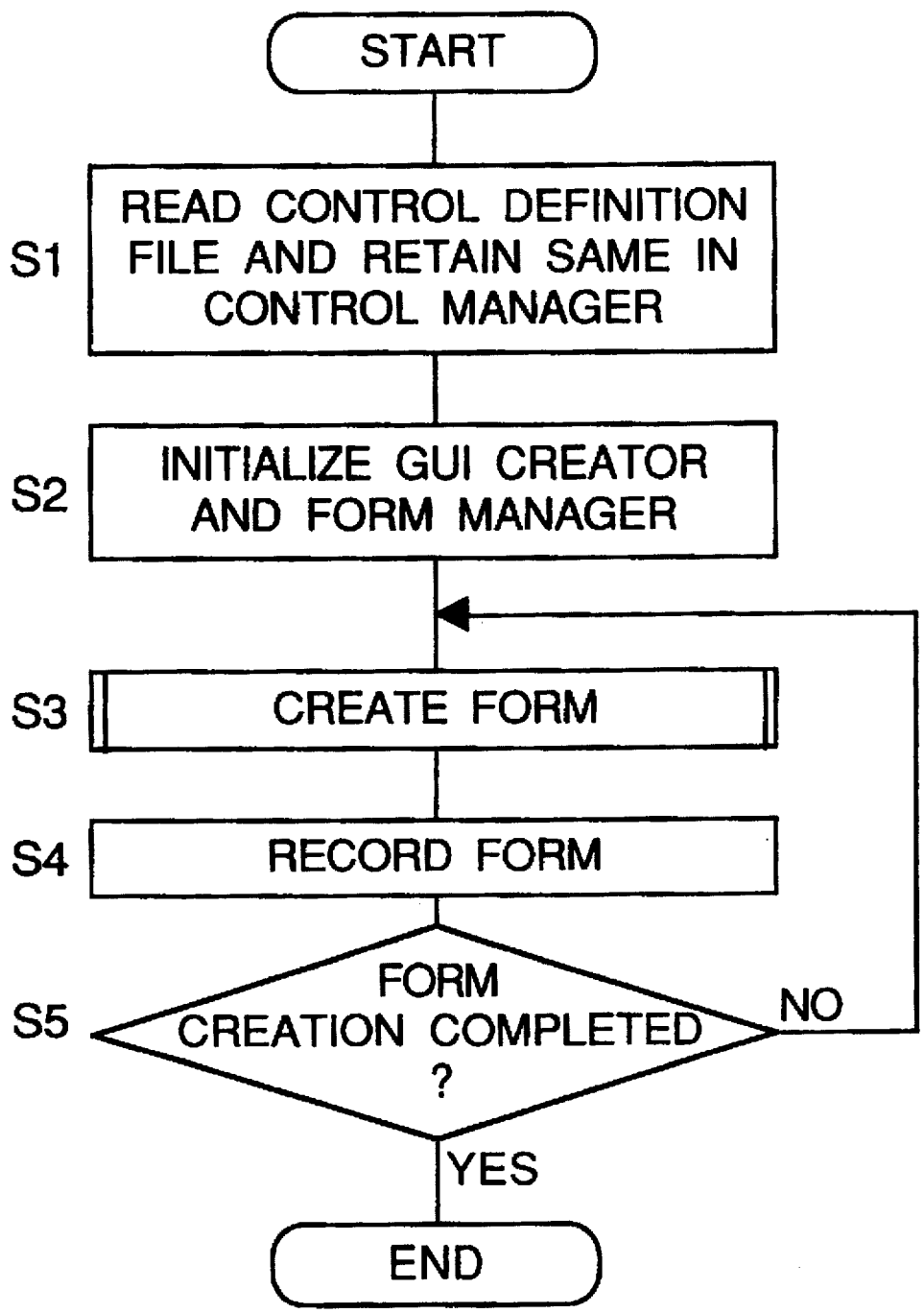
FIG. 4 is a flow chart showing the flow of a GUI creating operation as executed under the control of a controller seen in FIG. 1.

FIG. 4 is a flow chart of a GUI creating operation which is executed by the GUI creator 1, the control manager 2, and the form manager 5 under the control of the controller 9 in FIG. 1. The process of GUI creating operation will now be explained with reference to FIG. 4.

When the GUI creation system is activated, the following GUI creating operation starts.

At step S1, a control definition file designated through the display screen 11 displayed by the GUI creator 1 is read from the control definition file storage 3 by the control manager 2, and a control according to the control definition file is held in the internal memory.

The control definition file contains descriptions of device information on the information processing device to be employed, such as screen size, model or type, and version, and also of the definition of functions of the control (control definition) which may be utilized in connection with GUI creation. The control manager 2 holds these pieces of information in the internal memory thereof in such a way that will enable the operator to utilize them for GUI creation.

At step S2, on the basis of the aforesaid information held in the internal memory of the control manager 2, the GUI creator 1 and the form manager 5 are initialized.

At step S3, on the basis of a designation from a form creating editor area 14 on the display screen 11 displayed by the GUI creator 1, a 'form' which constitutes the target GUI is created by the GUI creator 1.

At step 4, the 'form' thus created in step S3 is registered in the form storage 6 by the form manager 5.

At step S5, decision is made whether or not the form creation operation has been completed, i.e., whether or not further 'forms' which constitute the target GUI still exist. If further 'forms' still exist, the program returns to step S3 to begin creation of a next 'form'. Whilst, if all 'forms' have been created, the GUI creating operation ends.

Figure 5:
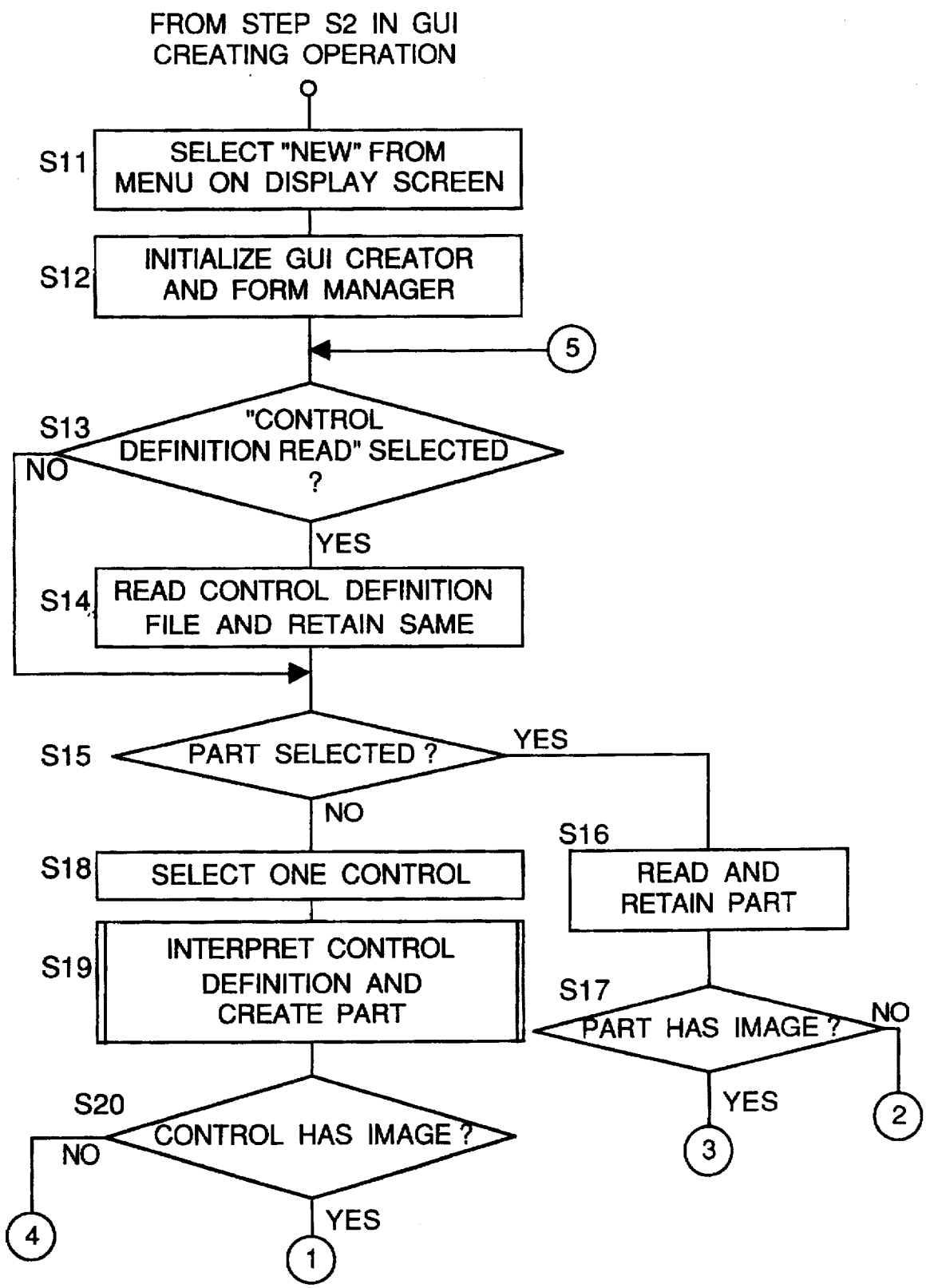
FIGS. 5 and 6 are detailed flow charts showing a 'form' creating operation as executed in the GUI creating operation shown in FIG. 4.
Figure 6:
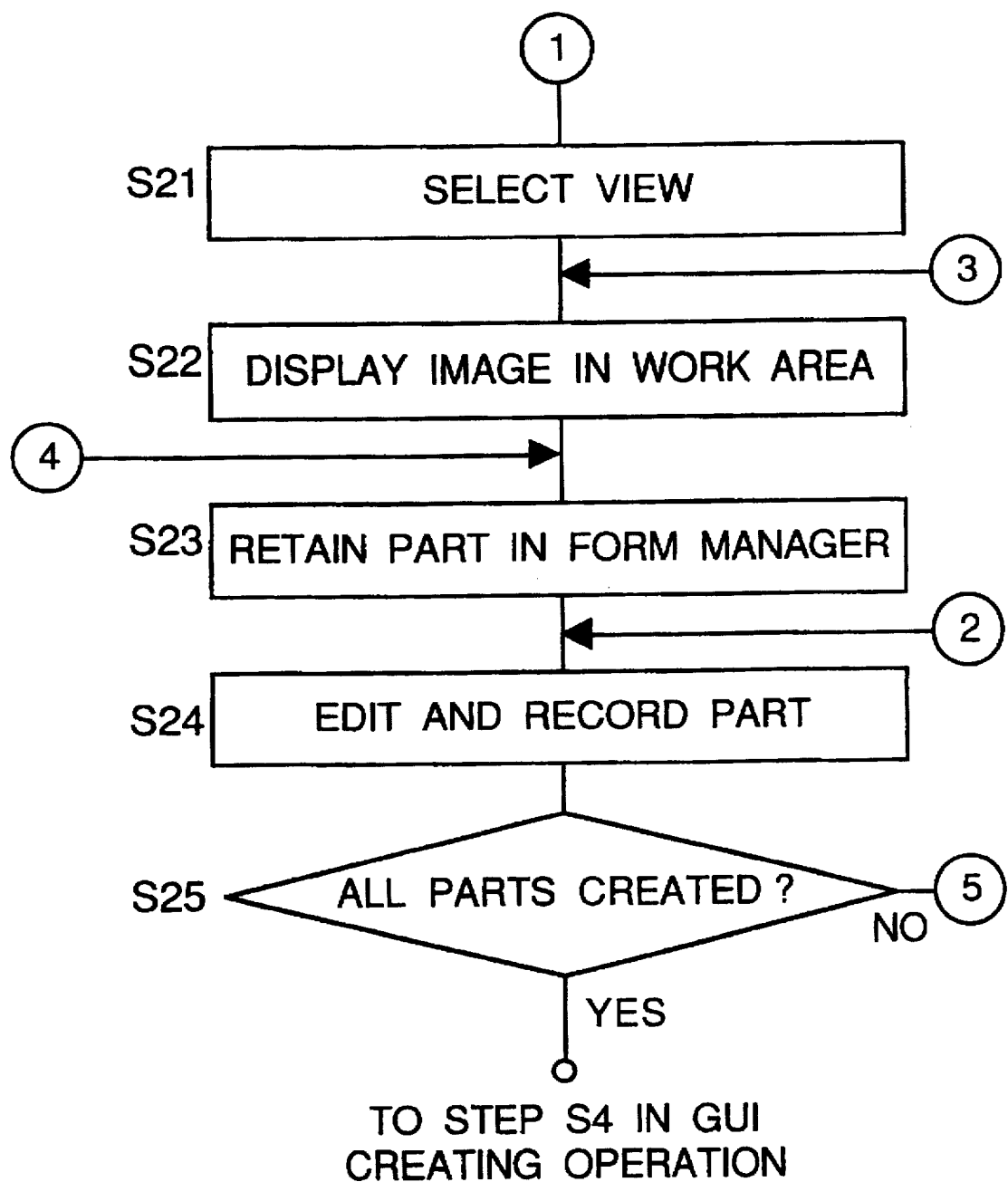

FIGS. 5 and 6 are detailed flow charts of the form creating operation executed at step S3 in the FIG. 4 flow chart of the GUI creating operation. Now, it is assumed that a 'form' is to be created anew, for example, and the required form creating operation is explained with reference to FIGS. 5 and 6.

At step S11, an item "New" is selected by a mouse or the like from a menu 15 in the form creating editor area 14 on the display screen 11 displayed by the GUI creator 1.

At step S12, with the item "New" selected at step S11, the GUI creator 1 and the form manager 5 are initialized anew.

At step S13, decision is made by the GUI creator 1 whether or not an item "Control Definition Read" has been selected from the menu 15 in the form creating editor area 14 on the display screen 11. If the decision is that the selection has been made, the program advances to step S14. If not, the program advances to step S15.

At step S14, a new control definition file is read by the control manager 2 from the control definition file storage 3, and a control corresponding to the control definition file is retained.

By selecting the item "Control Definition Read" as required in the process of file creating operation, it is possible to add a control wanted for use and/or delete any unwanted control. Also, by reading an entirely different control definition file it is possible to create a GUI for a different information processing device.

On the other hand, at step S15, decision is made by the GUI creator 1 whether or not a constituent part to be reutilized has been selected from the list presented in a part selection area 16 on the display screen 11. If the decision is that the selection has been made, the program advances to step S16. If not, the program advances to step S18.

At step S16, the constituent part selected at step S15 is read from the part storage 7 by the form manager 5 and is held in its internal memory.

At step S17, on the basis of the particulars of the constituent part held in the internal memory at step S16, decision is made by the GUI creator 1 whether or not the constituent part has an image. If it is decided that the constituent part has an image, the program advances to step S22. If not, the program advances to step S24.

At step S18, out of the controls read by the control manager 2 from the control definition file storage 3 and held in the internal memory of the control manager at step S1 in the FIG. 4 flow chart of GUI creating operation and at step S14 in the FIG. 5 flow chart, one control is selected by the GUI creator 1.

In this way, where any constituent part recorded in the part storage 7 is not reutilized but instead a constituent part is to be created anew, a control is selected which is a model of the constituent part to be created.

At step S19, the control definition described in the control selected at step S18 is interpreted by the control manager 2. On the basis of this interpretation, a constituent part is created in such a form as is adapted for actual use.

At step S20, on the basis of the interpretation of the control definition at step S19, decision is made by the GUI creator 1 whether or not the control has an image. If it is decided that the control has an image, the program advances to step S21. If not, the program advances to step S23.

At step S21, on the basis of an instruction from the list presented in the view selection area 13 on the display screen 11, a corresponding view is selected from the view storage 8 by the GUI creator 1.

Thus, the control (which represents the function of the constituent part) selected at step S18 and the view, selected at step S21, which is a visual representation, are correlated to each other. In this way, by selecting a control and a view independently and correlating them to each other, it is possible to create constituent parts having different visual appearances from a single control.

At step S22, an image of the view selected at step S21 is displayed by the GUI creator 1 in the work area 17 within the form creating editor area 14 on the display screen 11.

In this conjunction, when the image of the constituent part is to be customized to suit the 'form' being presently created, the position and size of the constituent part are changed on the work area 17.

At step S23, the constituent part created at step S19, as well as the constituent part correlated with the view at step S22, is held by the form manager 5.

At step S24, constituent parts are edited as required from the part editor area 18 on the display screen 11, by setting attribute values for the individual constituent parts and/or writing event functions. Constituent parts retained by the form manager 5 are saved in the part storage 7 by selecting a save button 19 in the part editor area 18.

Obviously, when constituent parts read out at step S16 are used just as they are, such editing/recording of the constituent parts is not required.

At step S25, decision is made by the GUI creator 1 whether or not all the constituent parts of the object 'form' have been created. If not all the constituent parts have been created, the program returns to step S13 and proceeds to creation of a next constituent part. If all the constituent parts have been created, the form creating operation ends, and the program advances to step S4 in the flow chart of GUI creating operation.

Figure 7:
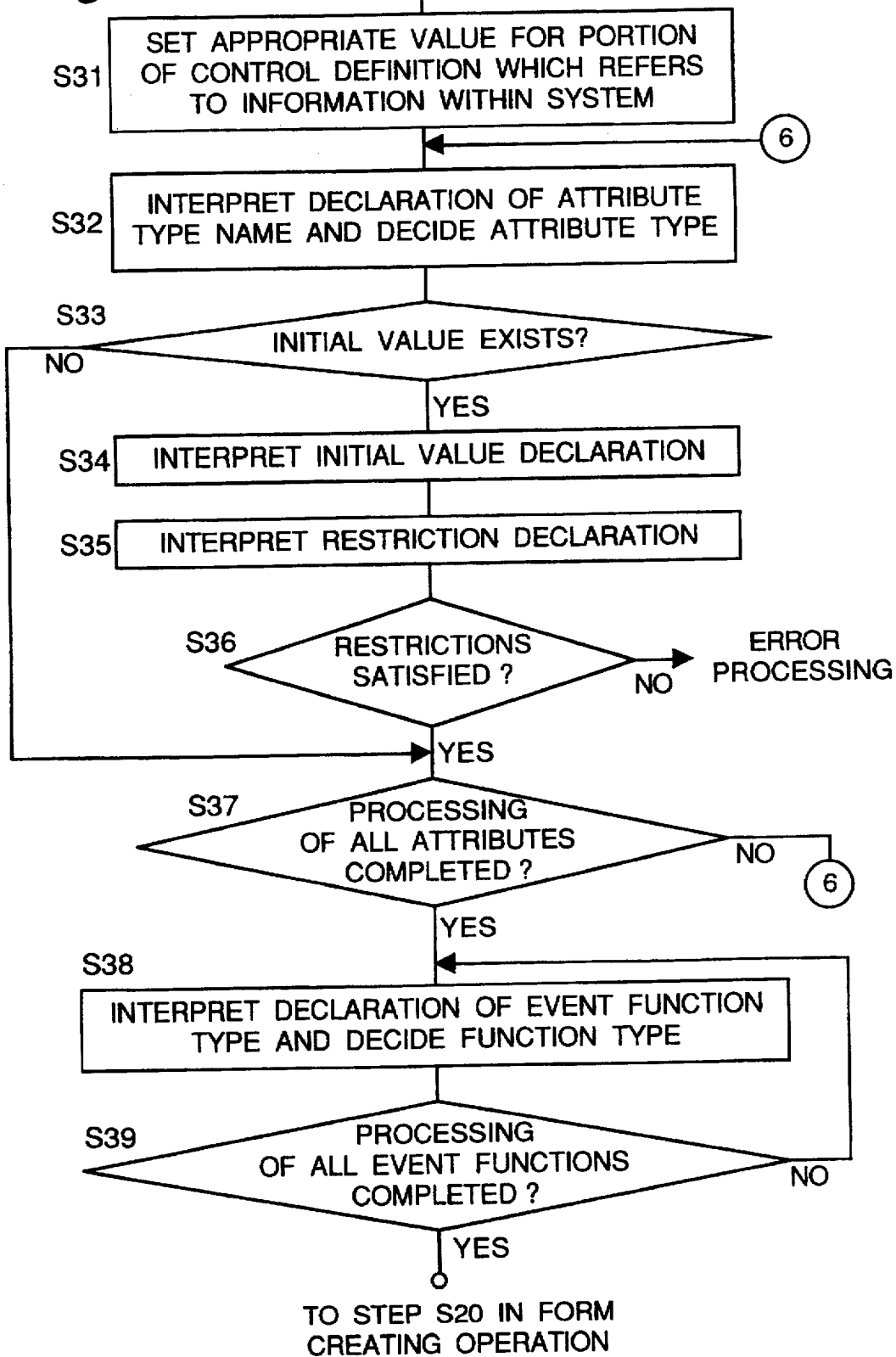
FIG. 7 is a detailed flow chart showing a control definition interpreting operation as executed in the 'form' creating operation shown in FIG. 5.

FIG. 7 is a detailed flow chart of the control definition interpreting operation which is executed at aforesaid step S19 in the FIG. 5 flow chart of the form creating operation. The flow of the control definition interpreting operation is described with reference to FIG. 7.

At step S31, in a portion of the description of a control definition read from one control which portion instructs reference to relevant pieces of information within the GUI creation system (e.g., "@ ProductType", as in FIG. 3), some appropriate value is set by reference to the information within the GUI creation system.

Of these pieces of information, those common to the GUIs to be created, such as the product type name (@ ProductType) and version (@ Version), are held by the control manager 2. Information which may vary according to the GUI to be created, such as size of the 'form' (@ FORMWIDTH, @ FORMHEIGHT), is held by the form manager 5. At this step S31, therefore, necessary information is obtained from the internal memory of either one of the control manager or the form manager according to a character string that follows "@" in the portion which refers to the internal information of the GUI creation system, and the information thus obtained is set as a value.

At step S32, interpretation is made with respect to the declaration of the type name of an attribute to decide the type.

At step S33, decision is made whether or not there is described an initial-value declaration with respect to the attribute. If the decision is that there is a description of the initial-value declaration, the program advances to step S34. If not, the program advances to step S37.

At step S34, interpretation is made of the initial-value declaration of the attribute to decide the initial value.

At step S35, interpretation is made of the restriction declaration of the attribute.

At step S36, decision is made whether or not the initial value decided at step S34 can meet the interpretation results of the restriction which were obtained at step S35. If the initial value meets the interpretation results, the program advances to step S37. If not, the program goes into error handling, i.e., error processing.

At step S37, decision is made whether or not all the attributes declared in the subject control definition have been completely dealt with. If the decision is that they have not been completely dealt with, the program returns to step S32 and goes into operation with respect to a next attribute name. If complete, the program advances to step S38.

At step S38, interpretation is made of the function type declaration in an event function to determine the type of the function.

At step S39, decision is made whether or not handling or processing has been completed with respect to all the event functions declared in the present control definition. If it is decided that processing for all the event functions is not complete, the program returns to step S38 and proceeds to the step of processing a next event function. If complete, the control definition interpreting operation ends. As a result, an actual constituent part is created.

Thereafter, the operation advances to aforesaid step S20 in the flow chart (FIG. 5) of the form creating operation.

As described above, the control definition file creator 4 creates a control definition file in which device information of an applicable device and the definition of functions available for use in creation of the GUI are described in such form as will enable a 'form' creating person to utilize them, and the control definition file created by the control definition file creator 4 is recorded in the control definition file storage 3. The control manager 2 has means for interpreting the device information and control definition described in the control definition file, and the GUI creator 1 creates a constituent part of the 'form' using a 'control' resulting from the interpretation.

Therefore, in conjunction with the creation of a GUI, when it is intended that constituent parts which did not exist in the past should be created, or that constituent parts having functions different from those of existing constituent parts should be created, or that information processing devices which have not been the object of the GUI creation should be employed, it is only required that a control definition file suited for the purpose be created anew by the control definition file creator 4 and that the same be recorded in the control definition file storage 3.

According to the invention, it is possible to readily change the control definitions and the information on information processing devices applicable for use with the GUIs to be created and, therefore, to create GUIs for various information processing devices, as well as GUIs having various functions.

Constituent parts created are recorded individually, i.e., separately from each other, in the part storage 7 under the management of the form manager 5. In the 'form' creation by the GUI creator 1, therefore, it is possible to allow a plurality of 'forms' to share a constituent part (or constituent parts) recorded in the part storage 7 by using the constituent part (or constituent parts) as it is (or they are). It is also possible to customize any recorded constituent part to suit it to the object 'form', so that existing constituent parts can be effectively utilized.

Therefore, according to the present invention, it is possible to efficiently carry out GUI creating operations.

As already stated, in the present embodiment, a conditional branch program is described in the control definition, the conditional branch program being interpreted by the control manager 2. On the basis of the interpretation, the GUI creator 1 sets functions of the control.

If it is not possible to describe a conditional branch program and there is provided no means for interpreting the conditional branch program, it is necessary for the person who creates constituent parts utilizing the control to provide similar functions or restrictions through descriptions of event functions- This will result in complex programming for GUI creating operations.

However, according to the present embodiment, conditional branch programming can be made in conjunction with control definition writing. This permits addition of restrictions to the functions of the control and writing of inter-control relationships, it being thus possible to provide a control having various functions. Therefore, by utilizing a control having different functions to create constituent parts, it is possible to reduce the load of programming for GUI creation as compared with conventional load level. In other words, writing of one control definition can set various functions adapted for applicable devices and target 'forms' and constituent parts.

Further, it is arranged that a program which refers to the information (e.g., 'form' size, type of applicable device, item size, etc.) within the GUI creation system (a character string beginning with symbol @ in the present embodiment) is described in the control definition, so that in accordance with the reference program the GUI creator 1 refers to the information within the GUI creation system for the setting of control functions.

Therefore, with the description of one control definition, it is possible to set various functions adapted for subject devices and desired 'forms' and constituent parts.

For the conventional GUI creation system, the person who creates constituent parts is identical with the person who creates 'forms'. In contrast to this, in the GUI creation system of the present embodiment, constituent parts and 'forms' are separately managed. Therefore, by using two units of the GUI creation system of the invention (in such a manner that the form storage 6 and part storage 7 of one unit are shared with the other GUI creation system), it is possible for different persons to carry out creation of constituent parts and creation of 'forms' in parallel at the same time.

Further, for the same reason, it is possible to change the function of the GUI to be created, by changing constituent parts alone with no change made with respect to the 'form'. In this case, if any constituent part subjected to change is a constituent part shared by a plurality of 'forms', those 'forms' are in effect simultaneously subjected to change, with the result that the trouble of 'form' changing is reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for developing a graphical user interface (GUI) for use in an information processing system, said information processing system including the following information sub-units: (1) at least one information processing device; (2) at least one GUI for use in said at least one information processing device; and (3) a plurality of constituent parts for use in said at least one GUI, said constituent parts each including a control which specifies the function of said constituent part and a visual representation of said control, said control being defined in a control definition file which specifies the information processing device in which said GUI being developed is to be used and the function performed by said constituent part in response to user input, said method for developing a GUI comprising the steps of:

(a) retrieving a desired control definition file corresponding to a constituent part to be created;
    (b) interpreting said desired control definition file to obtain information on the function of said constituent part to be created and a description of the information processing device in which the GUI being created is to be used;
    (c) creating said constituent part from the function and device information obtained by interpreting said control definition file; and (d) repeating steps (a)–(c) for each constituent part of the GUI being developed;

said step (c) utilizing control definition files wherein at least a single control definition file describes different functions respectively adapted for different image processing sub-units.

2. A method for creating a graphical user interface as described in claim 1, wherein a single control definition file describes different functions respectively adapted for different constituent parts such that multiple constituent parts are created from a single control definition file.

3. A method for creating a graphical user interface as described in claim 2, wherein, by describing different functions in a single definition file, information which is the same for multiple constituent parts is not repeated for each constituent part.

4. A method for creating a graphical user interface as described in claim 2, wherein a conditional branch in said single control definition file describes said different functions.

5. A method for creating a graphical user interface as described in claim 1, wherein a single control definition file describes different functions respectively adapted for different information processing devices.

6. A method for creating a graphical user interface as described in claim 5, wherein a conditional branch in said single control definition file describes said different functions.

7. A method for creating a graphical user interface (GUI) as described in claim 1, wherein a single control definition file describes different functions respectively adapted for different GUIs.

8. A method for creating a graphical user interface as described in claim 7, wherein a conditional branch in said single control definition file describes said different functions.

9. A method for creating a graphical user interface as described in claim 1, wherein created constituent parts are stored separately from created GUIs such that a constituent part created for use in a specific GUI is shared or reused in another GUI.

10. A method for creating a graphical user interface as described in claim 9, wherein a plurality of created GUIs are simultaneously changed by editing a single constituent part.

11. A system for developing a graphical user interface (GUI) for use in an information processing system, said information processing system including the following information processing sub-units: (1) at least one information processing device; (2) at least one GUI for use in said at least one information processing device; and (3) a plurality of constituent parts for use in said at least one GUI, said constituent parts each including a control which specifies the function of said constituent part and a visual representation of said control, said control being defined in a control definition file which describes the information processing device in which said GUI being created is to be used and the function performed by said constituent part in response to user input, said system for developing a GUI comprising:

(a) a control definition storage for storing a plurality of control definition files; and
    (b) a GUI creator for retrieving a desired control definition file corresponding to a constituent part to be created, interpreting said desired control definition file to obtain information on the function of said constituent part to be created and a description of the information processing device in which the GUI being created is to be used, creating said constituent part from the function and device information obtained by interpreting said control definition file, and repeating the functions of retrieving, interpreting, and creating for each constituent part of the GUI being developed;

said GUI creator utilizing control definition files wherein at least a single control definition file describes different functions respectively adapted for different image processing sub-units.

12. A system for creating a graphical user interface as described in claim 11, wherein a single control definition file describes different functions respectively adapted for different constituent parts such that multiple constituent parts are created from a single control definition file.

13. A system for creating a graphical user interface as described in claim 12, wherein, by describing different functions in a single definition file, information which is the same for multiple constituent parts is not repeated for each constituent part.

14. A system for creating a graphical user interface as described in claim 12, wherein a conditional branch in said single control definition file describes said different functions.

15. A system for creating a graphical user interface as described in claim 11, wherein a single control definition file describes different functions respectively adapted for different information processing devices.

16. A system for creating a graphical user interface as described in claim 15, wherein a conditional branch in said single control definition file describes said different functions.

17. A system for creating a graphical user interface (GUI) as described in claim 11, wherein a single control definition file describes different functions respectively adapted for different GUIs.

18. A system for creating a graphical user interface as described in claim 17, wherein a conditional branch in said single control definition file describes said different functions.

19. A system for creating a graphical user interface as described in claim 11, further comprising a part storage device for storing created constituent parts separately from created GUIs such that a constituent part created for use in a specific GUI is shared or reused in another GUI.

20. A system for creating a graphical user interface as described in claim 19, wherein a plurality of created GUIs are simultaneously changed by editing a single constituent part.

* * * * *